Feb. 18, 1964 P. F. POTCHEN 3,121,554
PACKING GLAND ASSEMBLY FOR VALVES, SHAFTS AND THE LIKE
Filed May 14, 1962 2 Sheets-Sheet 1
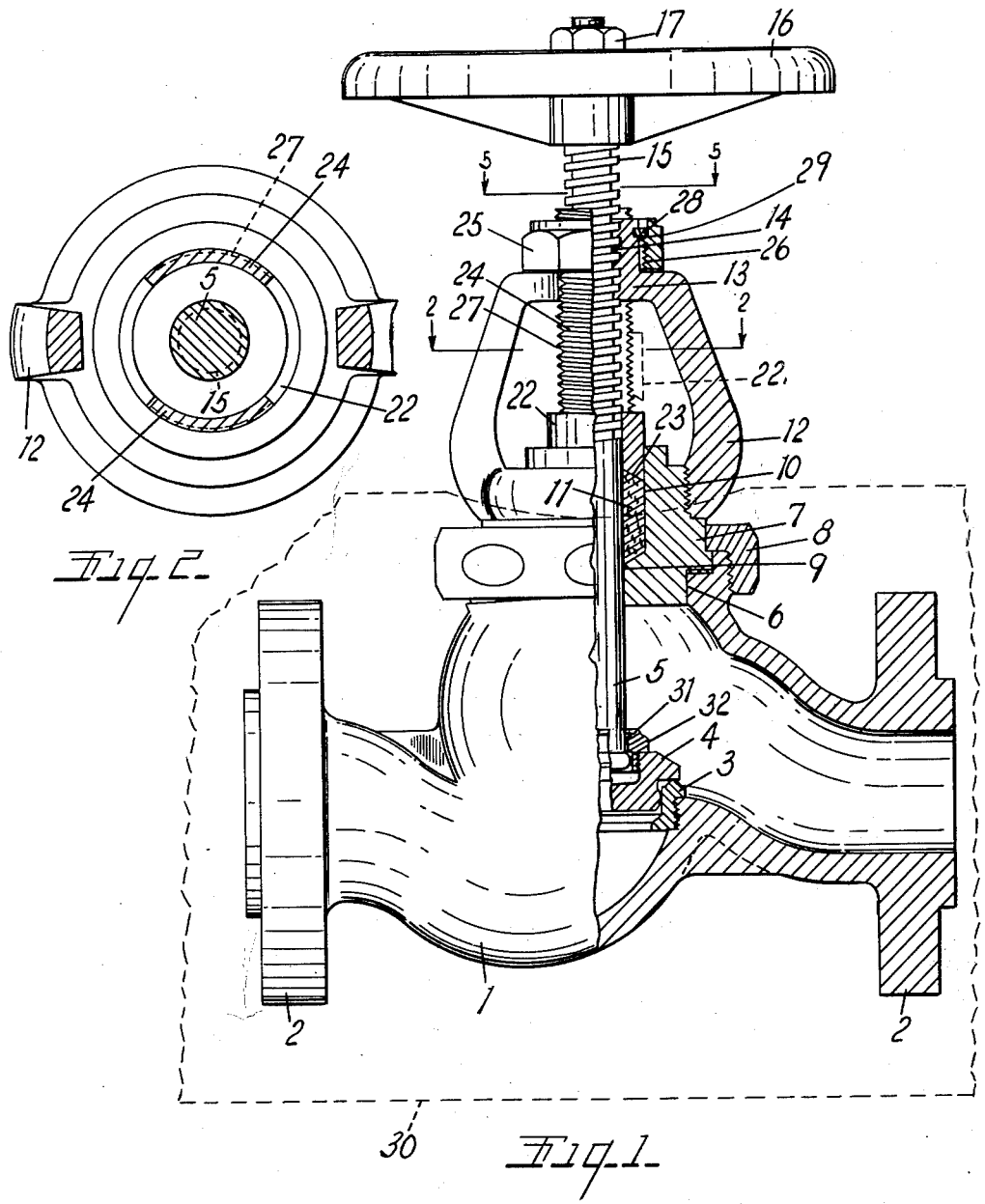
Fig. 2.
Fig. 1.
INVENTOR.
Peter Fr. Potchen
BY 
ATTORNEY

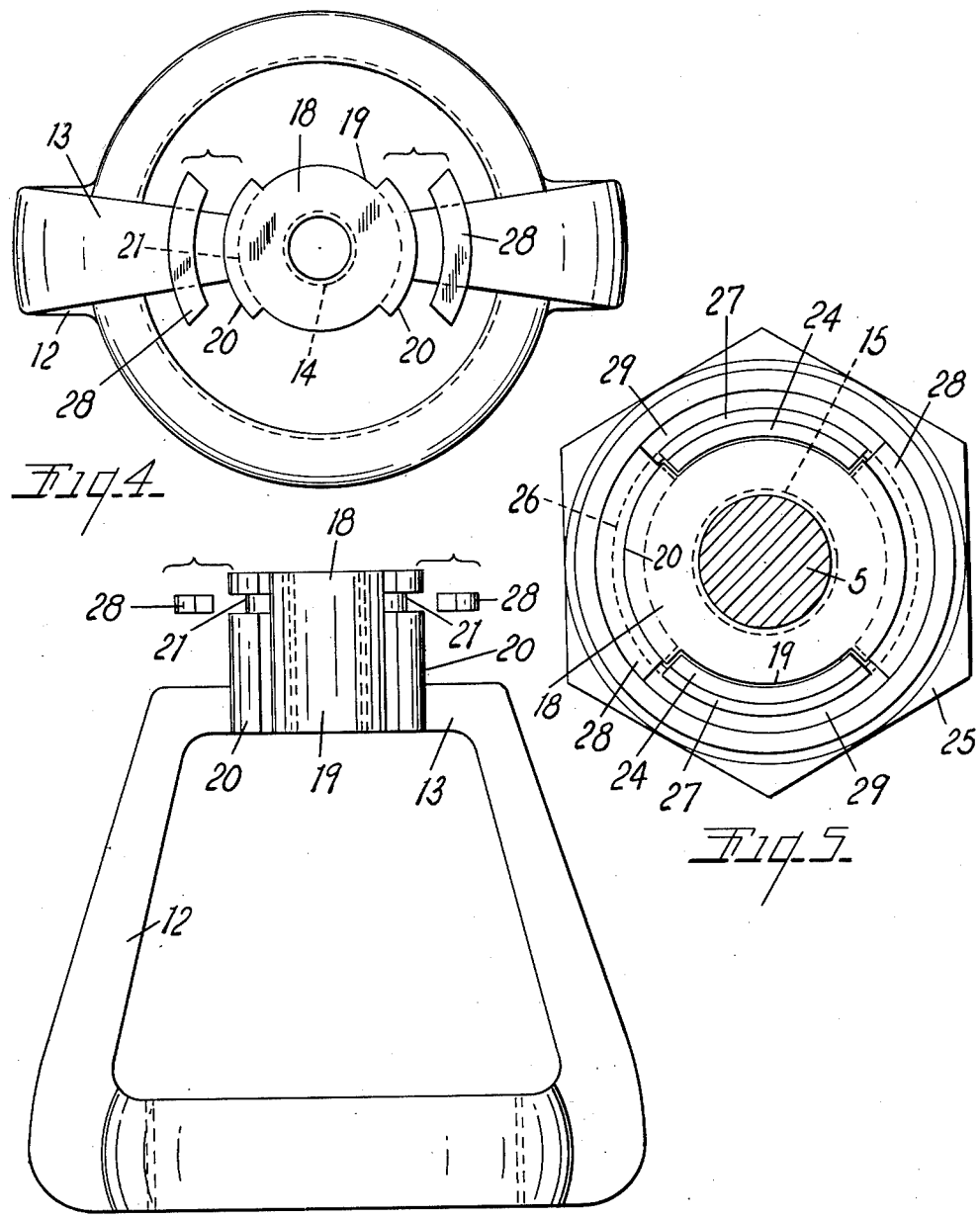

United States Patent Office 3,121,554
Patented Feb. 18, 1964

3,121,554
PACKING GLAND ASSEMBLY FOR VALVES, SHAFTS AND THE LIKE
Peter Fritz Potchen, 213 Portage Ave., Three Rivers, Mich.
Filed May 14, 1962, Ser. No. 194,402
9 Claims. (Cl. 251—214)

This invention relates to improvements in packing gland assembly for valves, shafts and the like. The principal objects of this invention are:

First, to provide an improved packing gland and packing gland mount particularly for high pressure and high temperature valves which will permit the packing of the valve to be more easily maintained and more accurately adjusted without interrupting service of the valve.

Second, to provide a packing gland and packing gland mount for valves which permits the packing to be adjusted from a point spaced from the valve body and less subject to the temperature of the fluid passing through the valve.

Third, to provide a packing gland mount for a valve which permits the packing to be removed and replaced with the valve open and without interrupting service in the pipe controlled by the valve.

Fourth, to provide a novel form of packing gland and packing gland actuating mechanism which assures true straight line motion of the packing gland without twist or tilting relative to the packing and the valve stem or shaft packed thereby.

Other objects and advantages of the invention will be apparent from a consideration of the following description and claims. The drawings, of which there are two sheets, illustrate a highly practical form of the packing gland and packing gland mount of the invention.

FIG. 1 is a side elevational view partially broken away in vertical cross section of a valve assembly with the packing gland and packing gland operating mechanism of the invention mounted thereon.

FIG. 2 is a cross sectional view taken along the plane of the line 2—2 in FIG. 1 and illustrating the yoke, valve stem and packing gland of the invention.

FIG. 3 is a side elevational view of the valve yoke of the invention with packing gland mount retaining keys illustrated in exploded relation thereto.

FIG. 4 is a top plan view of the yoke and retaining keys shown in FIG. 3.

FIG. 5 is a fragmentary horizontal cross sectional view taken along the plane of the line 5—5 in FIG. 1.

FIG. 1 illustrates a more or less conventional valve body 1 having coupling connections 2 for attachment in a pipe or conduit to control the flow of fluid through the conduit. Within the interior of the body there is provided a removable valve seat 3 with a valve disc 4 cooperative therewith and mounted on the inner end of a valve stem 5. The upper or outer side of the valve body defines an outwardly shouldered opening 6 through which the parts of the valve may be assembled. A valve or yoke bonnet 7 is seated in the shouldered opening and projects outwardly therefrom. A yoke ring nut 8 threaded on the upper end of the valve body secures the yoke bonnet in position and the bonnet defines a bore 9 passing the valve stem and an outwardly opening enlarged packing recess at 10 with a packing 11 positioned therein and around the stem 5.

The outer end of the bonnet 7 is exteriorly threaded to receive the lower or inner end of the yoke 12. The outer end or cross piece 13 of the yoke defines an internal thread 14 receiving and engaged with the valve operating thread 15 formed on the outer end of the stem 5. A suitable operating wheel 16 is secured to the outer end of the valve stem by the wheel nut 17.

As appears more clearly in FIGS. 3, 4 and 5 the outer end 13 of the yoke is formed or shaped with an integral generally cylindrical crown 18 that projects upwardly or outwardly from the cross piece and laterally beyond the sides thereof. It is within this crown 18 that the thread 14 is formed. Opposite sides of the crown 18 are radially inwardly recessed in segmental arcuate recesses 19 that are preferably symmetrical and extended through approximately 90° of the circumference of the crown. This leaves enlarged segmental cylindrically curved surfaces 20 which are symmetrical and extended through 90° of the circumference of the crown. Toward its outer end the segmental surfaces 20 of the crown are radially recessed or cut away in segmental slots 21 which open at their ends to the axial recesses 19.

The packing gland 22 cooperative with the packing 11 is a cylindrical element desirably having a concavely tapered lower end 23 and having upwardly or outwardly extending arcuate segments 24 formed on its outer side. The segments 24 project in sliding guided engagement through the recesses 19 in the sides of the crown and project variably thereabove depending upon the adjustment of the packing gland and the segments as will be described.

Positioned rotatively around the crown 18 and bearing against outer end 13 of the yoke is an internally threaded packing gland positioner nut 25. The threads 26 of the nut are engaged with the threaded exteriors 27 of the segments on the packing gland but are not engaged except in free rotating relation with the exterior of the crown along the cylindrical surfaces 20. In order to axially retain the nut 25 relative to the crown 18, a pair of segmental keys 28 are positioned in the segmental grooves 21 and projected outwardly over an outwardly facing shoulder 29 formed in the top of the nut. The keys and nut are assembled by threading the nut onto the segment threads 27 until the upper ends of the segments are approximately level with the lower edge of the slots 21. The keys are then dropped into the recesses 19 in the sides of the crown and slid angularly into the slots 21. The nut is then threaded inwardly or more accurately the gland and gland segments 27 are threaded outwardly in the nut to project the ends of the segments between the end of the keys with the keys retained in the slots 21 and projecting over the shoulder 29 on the nut. It is then impossible for the keys to be displaced and rotation of the nut 25 in its axially retained position results in axial motion of the segments 24 and the gland 22 with the gland secured against rotation in the recesses 19. Since the normal function of the nut 25 is to press the gland 22 inwardly or downwardly to tighten the packing, the threads 27 on the segments and the mating threads on the inside of the nut are desirably formed as left hand threads so that the most natural clockwise rotation of the nut 25 results in tightening of the valve packing. However, this detail of the left hand thread is not essential.

The gland 22 can thus be adjusted and tightened from a conveniently spaced position beyond the side of the valve which is important when the valve is engaged in a thick layer of heat insulated material as indicated by the dotted lines at 30 in FIG. 1. The gland 22 does not rotate and is effectively guided for straight compressive action on the packing. When it is desired to add to the packing 11, the valve 4 can be closed and the gland 22 retracted upwardly to the dotted position shown at 22A in FIG. 1 to permit the introduction of additional packing material into the recess 10. In the event that it is necessary to remove an old packing and insert a new one while the valve is in service, the valve stem 5 can be rotated outwardly until the disc stem ring 32 seats against the inner side of the bonnet 7. The ring holds the disc 4 on the stem and outer face of the ring is provided with an outwardly facing circular rib 31 (see FIG. 1) which may be pointed to seal effectively against the inside of the bonnet and prevent leakage around the stem while the packing is changed.

The valve stem 5 is in effect a shaft extending rotatably into the body 1 of the valve and packed in the bonnet. The packing 11 and packing gland 22 will thus function to pack or seal a rotating shaft just as well as a valve stem. A shaft would not have the threads 15 but would be guidingly engaged with the crown 13.

What is claimed as new is:

1. A packing and gland assembly for a valve comprising,
   a body with a yoke bonnet and a yoke projecting from the bonnet,
   a valve stem extending through a packing recess formed in said bonnet and through the outer end of said yoke,
   a generally cylindrical crown formed on the outer end of said yoke and within which said stem is threadedly engaged,
   arcuate recesses extending axially along opposite sides of said crown,
   arcuate slots formed annularly around said crown and extending between said arcuate recesses,
   a packing in said packing recess,
   an annular packing gland guidingly engaged around said stem and compressingly engageable with said packing,
   arcuate segments formed integrally on and extending axially outwardly from said gland,
   said segments being guidingly received in and extending through said arcuate recesses in said crown and being threaded on their outer sides,
   a packing gland positioner nut seated on said yoke and around said crown,
   said nut having an internal thread engaged with the threads on said arcuate segments and having an annular recess in its outer end, and
   segmental keys seated in said arcuate slots and overlapping the edge of said annular recess between said arcuate segments.

2. A packing and gland assembly for a valve comprising,
   a body with a yoke bonnet and a yoke projecting from the bonnet,
   a valve stem extending through a packing recess formed in said bonnet and through the outer end of said yoke,
   a generally cylindrical crown formed on the outer end of said yoke and within which said stem is threadedly engaged,
   arcuate recesses extending axially along opposite sides of said crown,
   an arcuate slot formed annularly around said crown and extending between said arcuate recesses,
   a packing in said packing recess,
   an annular packing gland guidingly engaged around said stem and compressingly engageable with said packing,
   arcuate segments formed integrally on and extending axially outwardly from said gland,
   said segments being guidingly received in and extending through said arcuate recesses in said crown and being threaded on their outer sides,
   a packing gland positioner nut seated on said yoke and around said crown,
   said nut having an internal thread engaged with the threads on said arcuate segments and having an annular recess in its outer end and
   a segmental key seated in said arcuate slot and overlapping the edge of said annular recess between said arcuate segments.

3. A packing and gland assembly on a valve comprising,
   a body with a yoke bonnet secured thereto and a yoke projecting from the bonnet,
   a valve stem extending through a packing recess formed in said bonnet and through the outer end of said yoke,
   a crown formed on the outer end of said yoke and within which said stem is threadedly engaged,
   an arcuate recess extending axially along the side of said crown,
   an arcuate slot formed annularly around a part of said crown and extending at one end to said arcuate recess,
   a packing in said packing recess,
   an annular packing gland guidingly engaged around said stem and compressingly engageable with said packing,
   an arcuate segment connected to and extending axially outwardly from said gland,
   said segment being guidingly received in and extending through said arcuate recess in said crown and being threaded on its outer side,
   a packing gland positioner nut seated against the outer end of said yoke and around said crown,
   said nut having an internal thread engaged with the threads on said arcuate segment and having an annular recess in its end, and
   a segmental key seated in said arcuate slot and overlapping the edge of said annular recess.

4. In combination with a valve having a bonnet with a packing therein and a yoke extending outwardly from the bonnet,
   a cross member on the outer end of said yoke defining a threaded valve stem bore,
   a valve stem engaged in said bore and extending through said packing,
   segmental arcuate grooved surfaces on opposite sides of said outer end of said yoke parallel to said stem,
   a cylindrical packing gland positioned around said stem and reciprocable therealong,
   externally threaded segments connected to and extending outwardly from said gland and slidably guided in said arcuate grooves,
   a gland operating nut positioned around and threadedly engaged with said threaded segments and bearing against the outer side of the cross member of said yoke,
   and means including segmental arcuate keys engaged in arcuate grooves formed in said cross member alongside of said threaded segments and overlapping an axially recessed shoulder on said nut restraining said nut axially against said cross member.

5. In combination with a valve having a bonnet with a packing therein and a yoke extending outwardly from the bonnet,
   a cross member on the outer end of said yoke defining a threaded valve stem bore,
   a valve stem engaged in said bore and extending through the packing,
   a segmental arcuate grooved surface on the side of said outer end of said yoke parallel to said stem,
   an annular packing gland positioned around said stem and reciprocable therealong,
   an externally threaded segment connected to and extending outwardly from said gland and slidably guided in said arcuate groove,
   a gland operating nut positioned around and threadedly engaged with said threaded segment and bearing against the cross member of said yoke,
   and means including a segmental arcuate key engaged in an arcuate groove formed in said cross member alongside of said threaded segment and overlying an axially recessed shoulder on said nut and restraining said nut axially against said cross member.

6. In combination with a valve having a bonnet with a packing therein and a yoke extending outwardly from the bonnet, a cross member on the outer end of said yoke defining a threaded valve stem bore, a valve stem engaged in said bore and extending through said packing, segmental arcuate grooved surfaces on opposite sides of said outer end of said yoke parallel to said stem, a cylindrical packing gland positioned around said stem and reciprocable therealong, externally threaded segments connected to and extending outwardly from said gland and slidably guided in said arcuate grooves, a gland operating nut positioned around and threadedly engaged with said threaded segments and bearing against the cross member of said yoke, and means restraining said nut axially against said cross member.

7. In combination with a valve having a bonnet with a packing therein and a yoke extending outwardly from the bonnet, a cross member on the outer end of said yoke defining a threaded valve stem bore, a valve stem engaged in said bore and extending through said packing, a segmental arcuate grooved surface on the side of said outer end of said yoke parallel to said stem, a packing gland positioned around said stem and reciprocable therealong, an externally threaded segment connected to and extending outwardly from said gland and slidably guided in said arcuate groove, a gland operating nut positioned around and threadedly engaged with said threaded segment and bearing against the cross member of said yoke, and means restraining said nut axially against said cross member.

8. In combination with a valve having a bonnet with a packing therein and a yoke extending outwardly from the bonnet, a cross member on the outer end of said yoke defining a threaded valve stem bore, a valve stem engaged in said bore and extending through said packing, a groove formed in the side of said outer end of said yoke parallel to said stem, a packing gland positioned around said stem and reciprocable therealong, an externally threaded segment connected to and extending outwardly from said gland and extending through said groove, a gland operating nut positioned around and threadedly engaged with said threaded segment and bearing against the cross member of said yoke, and means restraining said nut axially against said cross member.

9. A packing and gland assembly on a body with a yoke bonnet secured thereto and a yoke projecting from the bonnet, said assembly comprising a shaft extending rotatably through a packing recess formed in said bonnet and through the outer end of said yoke, a crown formed on the outer end of said yoke and within which said shaft is guidingly engaged, an arcuate recess extending axially along the side of said crown, an arcuate slot formed annularly around a part of said crown and extending at one end to said arcuate recess, a packing in said packing recess, an annular packing gland guidingly engaged around said shaft and compressingly engageable with said packing, an arcuate segment connected to and extending axially outwardly from said gland, said segment being guidingly received in and extending through said arcuate recess in said crown and being threaded on its outer side, a packing gland positioner nut seated against the outer end of said yoke and around said crown, said nut having an internal thread engaged with the threads on said arcuate segment and having an annular recess in its end, and a segmental key seated in said arcuate slot and overlapping the edge of said annular recess.

References Cited in the file of this patent
UNITED STATES PATENTS

| | | |
|---|---|---|
| 1,602,544 | Muend | Oct. 12, 1926 |
| 1,995,395 | Mohr | Mar. 26, 1935 |
| 2,373,001 | Allen | Apr. 3, 1945 |
| 2,694,547 | MacGregor | Nov. 16, 1954 |